United States Patent [19]

Birkle et al.

[11] Patent Number: 4,969,985

[45] Date of Patent: Nov. 13, 1990

[54] DEVICE FOR TRANSPORTING AGITATABLE MATERIAL HAVING A VIBRATOR WHICH IS SUBMERGED IN A LIQUID

[75] Inventors: Siegfried Birkle, Hoechstadt A/Aisch; Johann Gehring, Spardorf, both of Fed. Rep. of Germany

[73] Assignee: Siemensaktiengesellschaft, Berlin & Munich, Fed. Rep. of Germany

[21] Appl. No.: 489,450

[22] Filed: Mar. 6, 1990

[30] Foreign Application Priority Data

Mar. 6, 1989 [DE] Fed. Rep. of Germany ....... 3907185

[51] Int. Cl.⁵ .............................................. C25D 17/16
[52] U.S. Cl. .................................... 204/201; 204/222
[58] Field of Search ..................... 204/201, 222, 223

[56] References Cited

U.S. PATENT DOCUMENTS 4,670,120  6/1987  Birkle et al. .................. 204/201

FOREIGN PATENT DOCUMENTS 0209015  1/1987  European Pat. Off. .
3524510  7/1985  Fed. Rep. of Germany .

*Primary Examiner*—T. M. Tufariello
*Attorney, Agent, or Firm*—Kenyon & Kenyon

[57] ABSTRACT

An apparatus for transporting agitatable material through a liquid treatment bath, comprising a spiral conveyor trough mounted around a central tube in a gas-tight tank which contains a liquid into which a portion of the trough is submerged. The conveyor trough is provided with at least one product mixer mounted radially beneath the trough which is provided with openings which serve to guide the flow of the liquid. The device is especially effective as an electroplater.

5 Claims, 2 Drawing Sheets

DEVICE FOR TRANSPORTING AGITATABLE MATERIAL HAVING A VIBRATOR WHICH IS SUBMERGED IN A LIQUID

BACKGROUND OF THE INVENTION

The present invention relates to a device for transporting agitatable material using a vibrator in general and more particularly to such a device used for the purpose of galvanically deposition aluminum from aprotic, oxygen-free and anhydrous aluminum organic electrolytic solution. More specifically, the present invention is related to an improvement in such a device having a vibrator conveyor trough mounted in a spiral around a center tube and surrounded by a tank. This tank contains a liquid into which the vibrator is partially submerged along with the center tube.

It is known that by surface finishing metallic components, their life span can be extended and new fields of application can be developed. For example, coatings of light metal and ferrous material are effective in protecting relatively non-precious metals whose surfaces can corrode under the effects of the atmosphere. By means of appropriate pretreatment, the components receive a polished surface free of unwanted surface film. The metallic coating can be supplemented by a secondary treatment.

During galvanic treatment, the agitatable small parts must be held together so that the individual parts make electrical contact with each other. On the other hand, the agitatable material to be treated should be sufficiently spread out so that metal deposition can take place over as great an article surface area as possible. This also provides an optimally uniform current density on all parts. A further important prerequisite for achieving perfect metal platings with a uniform layer of uniform thickness is the sufficient agitation of the material during the galvanic treatment. The devices for electrolytic surface plating (electroplating) are equipped with conveyors for transporting the agitatable material through an electrolytic solution. A continuous or periodic admission and removal of the material is made possible through the use of corresponding admission and exit sluices. In addition, both the motion of the material, and the mixing as well as transport of the material through the electrolyte should be done so that the material is treated gently and sensitive parts are not mechanically damaged during galvanic treatment. These requirements are not only relevant in the case of electrolytic surface plating (electroplating), in particular in mass electrolytic surface plating, but are also of significance for the electrochemical surface treatment of agitatable material in liquids, e.g. as during chemical and electrolytic pickling in acids or alkaline liquids, as well as during electrolytic degreasing in alkaline baths, and electrolytic polishing. During electrolytic surface treatment, the agitatable material is wired as a cathode or as an anode. For example, the circuit arrangement is applied such that the agitatable material is an anode during electrolytic polishing, whereas the agitatable material is preferably wired as a cathode during the deposition of aluminum.

The prior art discloses a device suitable for the purpose of mass electroplating, in particular for the galvanic deposition of aluminum, in which a vibrator with horizontal and vertical vibrating components is used to transport the agitatable material through the treatment bath. By utilizing inertial force, this vibrator transports the agitatable material in an upward direction within a spiral conveyor trough around a supporting pedestal which is connected to the conveyor trough. The vibrator is placed with the supporting pedestal in a gas-tight vessel which contains an electrolytic solution into which the vibrator is partially submerged. For example, vibrators having a skew effect or tilted guides can serve as motive agents. In addition, gravity conveyors in the form of downspouts can be provided. Such vibrators simply require a relatively low motive force for operation and make the gentle conveyance of the agitatable material possible. One thus obtains an intensive movement of material and good electrolytic exchange as well as a uniform current intake over the entire active surface of the spread out material (U.S. Pat. No. 4,670,120, which corresponds to DE-OS No. 35 24 510).

Another prior art device for the surface treatment of agitatable material includes a spiral conveyor which is secured to a centrally mounted supporting pedestal. This conveyor is provided with several steps, whose step height is calculated so that the material turns while falling, thus providing enhanced mixing. A larger number of such steps at the same slope of the conveyor, however, leads to a corresponding enlargement of the apparatus (EPA No. 0 209 015).

Despite these prior devices, there is a need for simplifying and improving device for transporting agitatable material in a liquid using a vibrator. In particular, there is a need to obtain better intermixing of the agitatable material in the conveyor trough.

SUMMARY OF THE INVENTION

In a device of the type described above, this need is fulfilled by providing at least one product mixer in the conveyor trough, with the mixer mounted radially below the conveyor trough and having nozzle openings which also penetrate the trough. The openings guide a flow of liquid under pressure which aids in the mixing.

The present invention provides uniform exposure of the agitatable material to the electrolytic solution. The product mixers, mounted between transoms supporting the trough, enhance mixing of the material. Furthermore, because of their position between the transoms, the number of such mixers employed is not limited by the slope of the conveyor or by the size of the apparatus.

DETAILED DESCRIPTION

Figure 1:
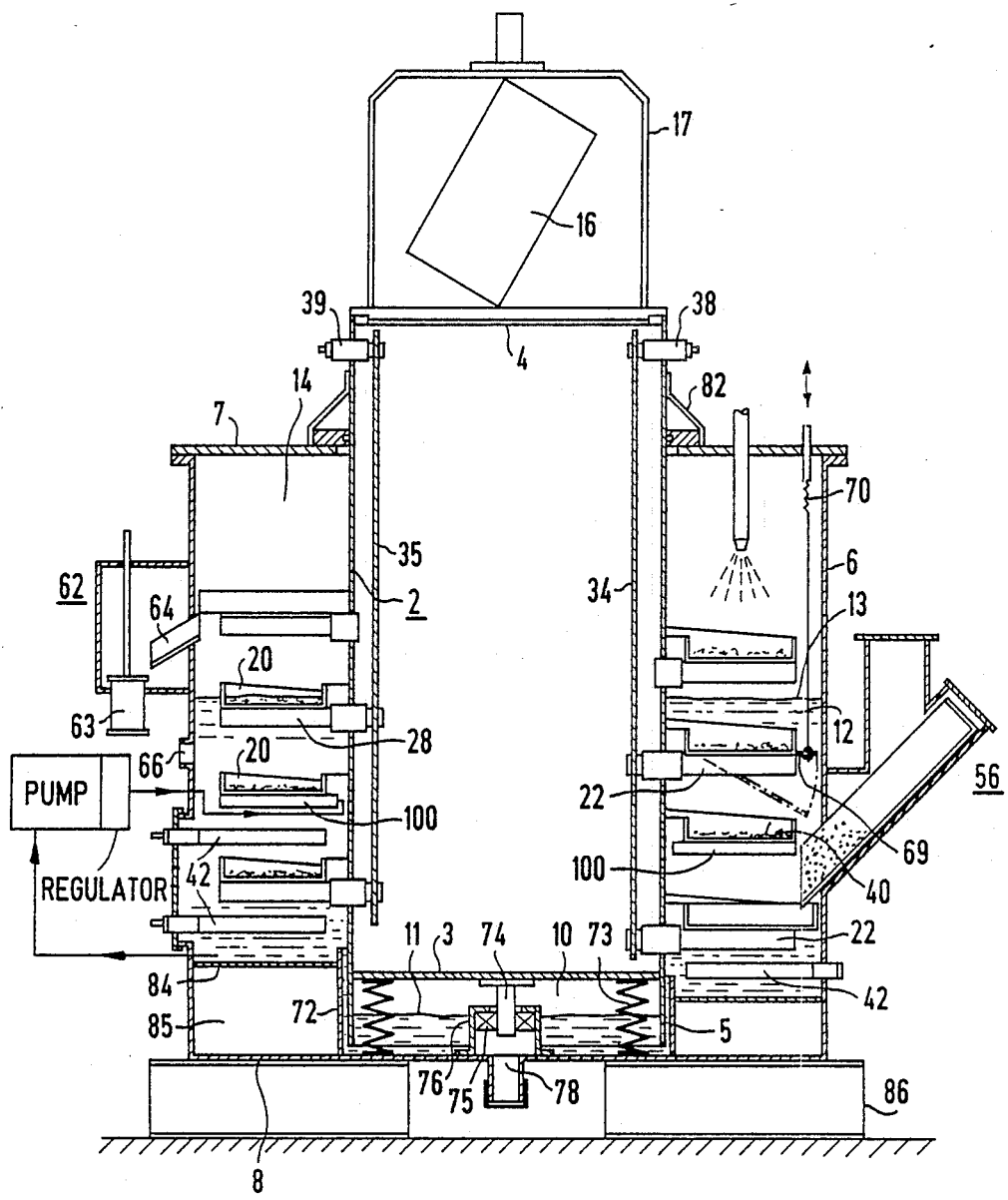
FIG. 1 is a schematic view of the device for transporting agitatable material via a conveyor trough according to the present invention.

The device according to FIG. 1 for transporting agitatable material, which can be used for the galvanic deposition of aluminum from aprotic, oxygen-free and anhydrous aluminum organic electrolytes, contains a central tube 2 with a floor 3 and a cover 4 which projects out of a tank 6, whose cover 7 makes gas-tight connection with the central tube 2. A gas cushion 10 is contained between the floor 3 of the central tube 2, which is bordered on the side by a hollow cylindrical pipe socket extending from the floor 3 of the central tube 2 and a liquid 12. The floor 3 and pipe socket 5 rest like a diving bell on a lower level 11 of liquid 12. The central tube 2 is partially submerged in this liquid, whose upper level 13 is also shown in FIG. 1. The liquid 12 can be an aprotic oxygen-free and anhydrous aluminum organic electrolytic solution.

A driving mechanism 16 for the central tube 2 and the conveyor trough 20 connected to this central tube 2 is provided above the cover 4 of the central tube 2 and thus outside of the tank 6. The driving mechanism 16 is secured to a bearing block 17. Using a cam structure (not shown in the Figures), the driving mechanism 16 produces a vibrating movement of the central tube 2 and thus of the conveyor trough 20, which is mounted in a spiral around the central tube 2. The conveyor trough 20 can be made of plastic (in particular, laminated plastic). Trough 20 is connected to transoms 22 and 28, which preferable act simultaneously as cathodes and, with the aid of lead-in insulators, are passed through the tank 2 in electrical isolation. The transoms 22 and 28, which are mounted above each other in an axial direction, are connected respectively over a common electrical bus bar 34 or 35 to a cathode terminal 38 or 39. Three anodes 42 are shown in FIG. 1, two of which are secured to the cover of an anode shaft, and whose electrical supply leads are passed through this cover in electrical isolation. The other anode 42 is secured to the wall of the tank 6.

An entry chute 56, which is schematically indicated, serves to supply the agitatable material 40, which is indicated in the Figures simply by dots and which can consist for example of screws or other small parts which are to be electroplated. An outlet sluice 62 contains an outlet port 63 and a chute 64. A supply inlet 66 is provided below the level 13 for the liquid 12.

Springs are provided between the floor 3 of the central tube 2 and the floor 8 of the tank 6, of which only two, 72 and 73 are shown in FIG. 1. A plug-cock 74, which serves the centering alignment, is mounted in a bearing 75 able to move in axial direction of the central tube 2. Preferably, the bearing 75 can be a self-aligning thrust bearing. The bearing 75 is placed in a bearing cartridge 76 which is secured to the floor 8 of the tank 6. The floor 8 is provided with an opening 78, which serves to drain the electrolytic solution 12. The central tube 2 is supported in a centering alignment which is able to move in the axial direction. A gas-tight connection is produced by a bellows-type seal 82 between the cover 7 of the resting tank 6 and the movable central tube 2.

The gas cushion 10 consists of an inert gas. In connection with an electrolytic solution 12, this gas can preferably consist of an oxygen-free gas, in particular nitrogen $N_2$, whose supply is not shown in the Figures for the sake of simplicity.

This gas cushion 10 can easily be compressed and decompressed by the upward and downward movements of the system vibrating from the central tube 2 and conveyor trough 20 so that the column of liquid through which passes the agitatable material 40 does not build up disadvantageous pressures.

The agitatable material 40 to be aluminized is introduced through the entry shaft 56 into the lower region of the tank 6, at which place it falls onto the lower end of the conveyor trough 20. The agitatable material 40 is transported on this conveyor trough 20, which is designed as a vibrating trough and which leads upward in a spiral, beyond and upwards above the upper level 13 of the electrolytic solution 12. It then falls into the funnel-shaped upper end of the chute 64 leading out of the tank 6.

By means of the drive mechanism 16, the conveyor trough 20 is made to vibrate with a somewhat spiral movement over the central tube. Due to the skewed movement and the accelerations and speeds arising thereby, a movement is forced upon the agitatable material 40 lying on the spiral conveyor trough 20 leading upwards s that the agitatable material 40 is transported with a continuous increase in height in the direction of the conveyor.

In case multiple traversals of the agitatable material 40 along the trough are desired, the conveyor trough 20 can be provided with a shutter 69, which can be controlled from outside the tank via a shutter control 70. Shutter 69 causes material to drop down from higher to lower sections of the trough.

According to the present invention, at least one product mixer is provided below the conveyor trough 20; preferably, several product mixers are mounted below the conveyor trough 20 at specified distances. Two such product mixers 100 are shown in FIG. 1.

Figures 2, 3:
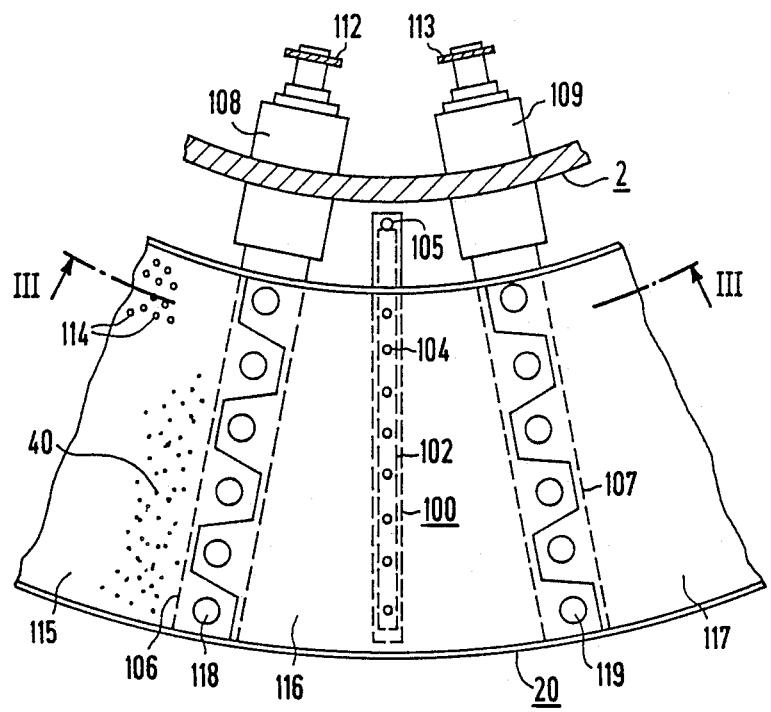
FIG. 2 is a plan view partially in section of the trough of FIG. 1 with the mixer structure of the present invention attached thereto.
FIG. 3 is a sectional view taken along line III—III of FIG. 2.

These product mixers 100 are mounted radially below the conveyor trough 20 as shown in FIG. 2 Each product mixer is provided with a bore-hole 12 running in its longitudinal direction and with perpendicular nozzle openings 104, which also pass through the conveyor trough 20. The product mixer is mounted between two transoms 106 and 107, which pass through the central tube with their retaining sockets 108 and 109, respectively, and to which the bus bars 112, 113 are secured. The electrolytic solution can be supplied through a connecting bore-hole 105 and emerges from nozzle openings 104 at a preferably adjustable, increased pressure. This pressurization can be provided by a conventional pump and regulator structure feeding the solution to the bore-hole at 105 as illustrated in FIG. 1. The flow of the electrolytic solution through the nozzle openings 104 provides additional mixing of the material as it moves along the trough, whose further perforation is indicated in FIG. 2 by the openings 114. The floor of the conveyor trough 20 can preferably consist of exchangeable segments 115 to 117, which are secured with clamping screws 118 and 119 to the transoms 106 and 107.

The arrangement of the product mixer 100 below the conveyor trough 20 between the transoms 106 and 107, which simultaneously serve as supporting bars, is shown in section in FIG. 3. The movement of the electrolytic solution emerging from the nozzle openings 104 is directed perpendicularly away from the trough and towards the axial direction of movement of the agitatable material 40. This both produces a good intermixing of the agitatable material 40 and enhances the uniformity of deposition of plating onto the agitatable material. In one specific embodiment, the bore holes 104 need not be perpendicular to the plane of the conveyor trough 20, but rather can be tilted with respect to such a perpendicular plane such that a component in the direction of movement of the agitatable material along the trough results.

In the illustrated embodiment, a device for the electrolytic surface plating of agitatable material 40 is shown in which the material is transported through an electrolytic liquid for this purpose. However, the device can also be used for transporting agitatable material 40 which passes through the device for the purpose of pretreatment, e.g., cleaning or pickling as well as degreasing. The device will then contain a liquid treatment medium in place of the electrolytic liquid, e.g. a cleaning agent or a grease solvent. Further, the device can be used for secondary treatment of an agitatable material, e.g. to extract water.

What is claimed is:

1. A device for transporting agitatable material comprising:
   (a) a spiral conveyor trough having a central tube;
   (b) a vibrator coupled to said conveyor trough to form therewith a vibratable unit;
   (c) a gas-tight tank containing a liquid, said vibratable unit at least partially submerged therein; and
   (d) at least one product mixer having a plurality of nozzle openings therein, said product mixer mounted below said trough and extending radially, said openings extending through said trough, whereby said openings can guide the flow of a liquid provided to said mixer.

2. The device of claim 1 wherein the conveyor is supported on transoms and the mixers are situated therebetween.

3. The device of claim 1 wherein the mixer comprises a longitudinal tube with a longitudinal bore therein, said nozzle opening extending through the wall of said tube along its length.

4. The device of claim 1 wherein the orientation of the openings in the product mixer is perpendicular to the plane of the trough so that the movement of liquid provided to said mixer is directed perpendicularly away from the trough.

5. The device of claim 1 wherein the orientation of the openings in the product mixer is tilted with respect to the plane of the trough so that the movement of liquid provided to said mixer has a component in the direction of the surface of the trough.

* * * * *